United States Patent [19]

Steele et al.

[11] Patent Number: 4,836,499
[45] Date of Patent: Jun. 6, 1989

[54] BUTTERFLY VALVES

[75] Inventors: James R. Steele, Stillwater; Jerry W. Scherfenberg, Plymouth, both of Minn.

[73] Assignee: Dynamic Air Inc., St. Paul, Minn.

[21] Appl. No.: 229,334

[22] Filed: Aug. 9, 1988

Related U.S. Application Data

[63] Continuation-in-part of Ser. No. 95,895, Sep. 14, 1987, abandoned.

[51] Int. Cl.[4] .............................................. F16K 1/228
[52] U.S. Cl. .................................... 251/173; 251/214; 277/206 R
[58] Field of Search ............... 251/172, 173, 214, 306; 277/205, 206 R

[56] References Cited

U.S. PATENT DOCUMENTS

| Re. 23,613 | 1/1953  | Danks .        |           |
|------------|---------|----------------|-----------|
| 1,844,641  | 2/1932  | De Wein .      |           |
| 2,705,016  | 3/1955  | Saar .         |           |
| 2,939,674  | 6/1960  | Anderson .     |           |
| 2,979,350  | 4/1961  | Lansby         | 277/206 X |
| 3,074,421  | 1/1963  | Borcherdt .    |           |
| 3,414,234  | 12/1968 | Henrion .      |           |
| 3,540,520  | 11/1970 | Abraham et al. |           |
| 3,638,674  | 2/1972  | Forst et al. . |           |
| 4,025,050  | 5/1977  | Manki et al. . |           |
| 4,026,514  | 5/1977  | Sumner et al. .|           |
| 4,103,909  | 8/1978  | Hoffman et al. | 251/214 X |
| 4,176,675  | 12/1979 | Liberman .     |           |
| 4,254,936  | 3/1981  | Schuurman .    |           |
| 4,289,296  | 9/1981  | Krause .       |           |
| 4,325,558  | 4/1982  | Poggio .       |           |
| 4,372,530  | 2/1983  | Livorsi .      |           |
| 4,378,104  | 3/1983  | Ben-Ur .       |           |
| 4,398,731  | 8/1983  | Gorman et al.  | 277/205 X |
| 4,540,457  | 9/1985  | LaValley .     |           |

Primary Examiner—A. Michael Chambers
Assistant Examiner—John C. Fox
Attorney, Agent, or Firm—Jacobson and Johnson

[57] ABSTRACT

The present invention comprises a transport system having an annular inflatable seal which has an annular interior domed portion which expands as an integral unit until it contacts the edge of a butterfly valve which engages the domed portion to form a slight recess in the annular seal which provides an airtight and locking seal with the annular seal having a pair of annular resilient legs operable to return the annular interior domed portion to its original position to permit the butterfly valve to be opened.

14 Claims, 5 Drawing Sheets

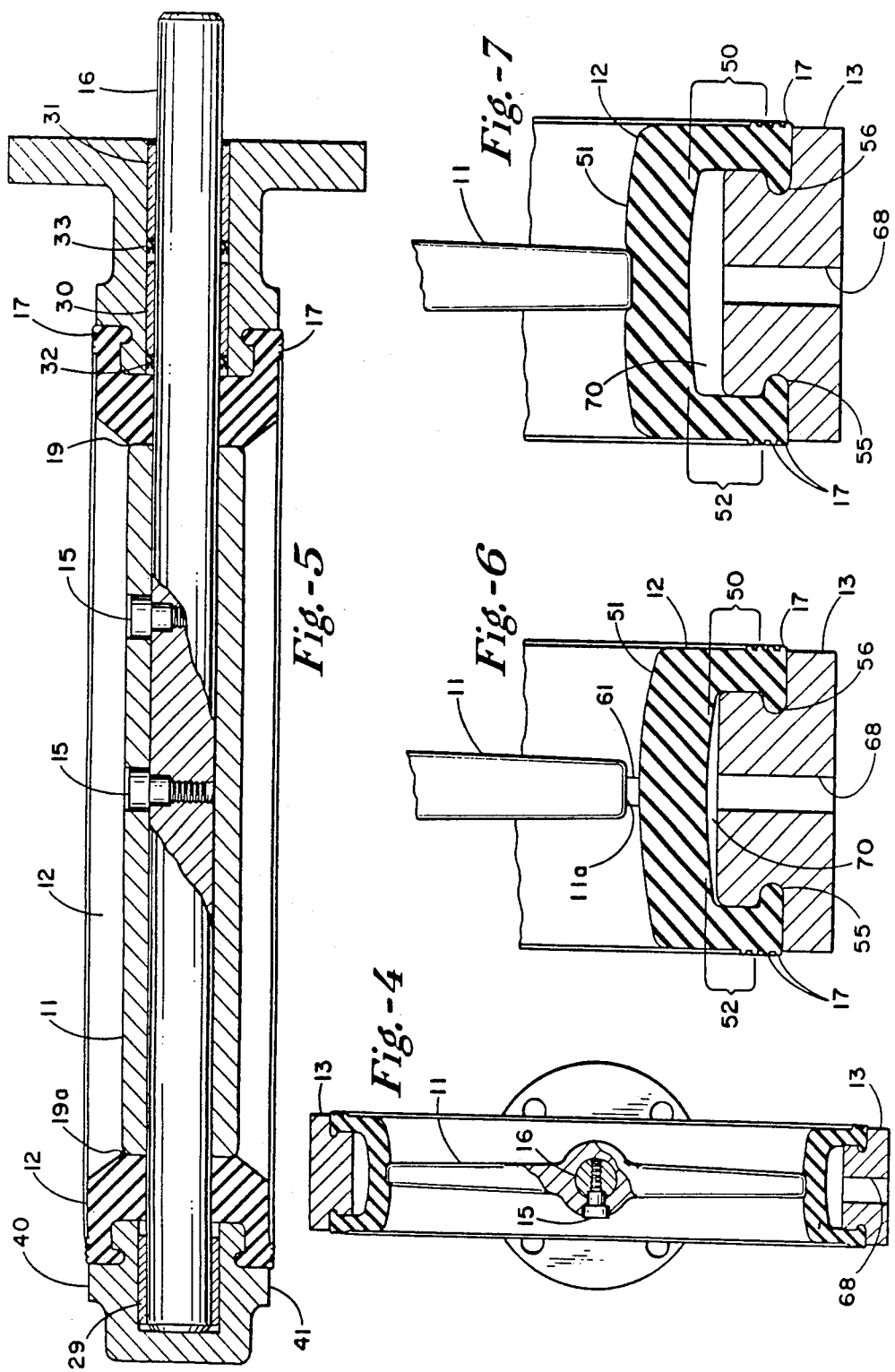

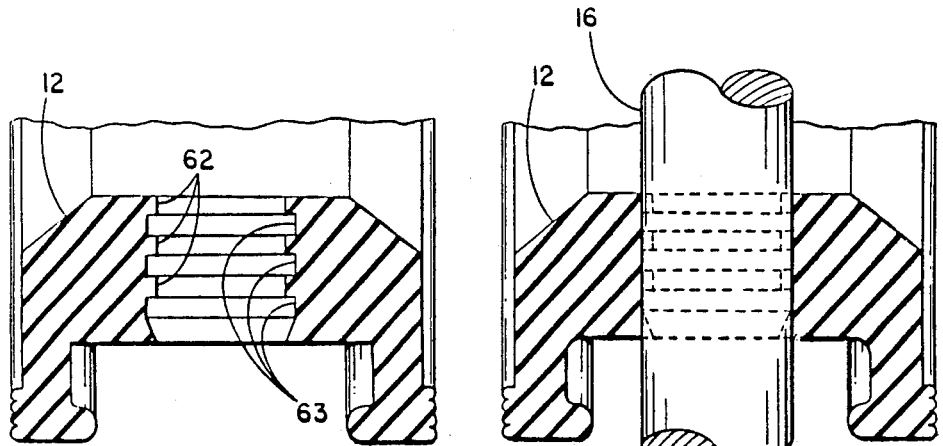
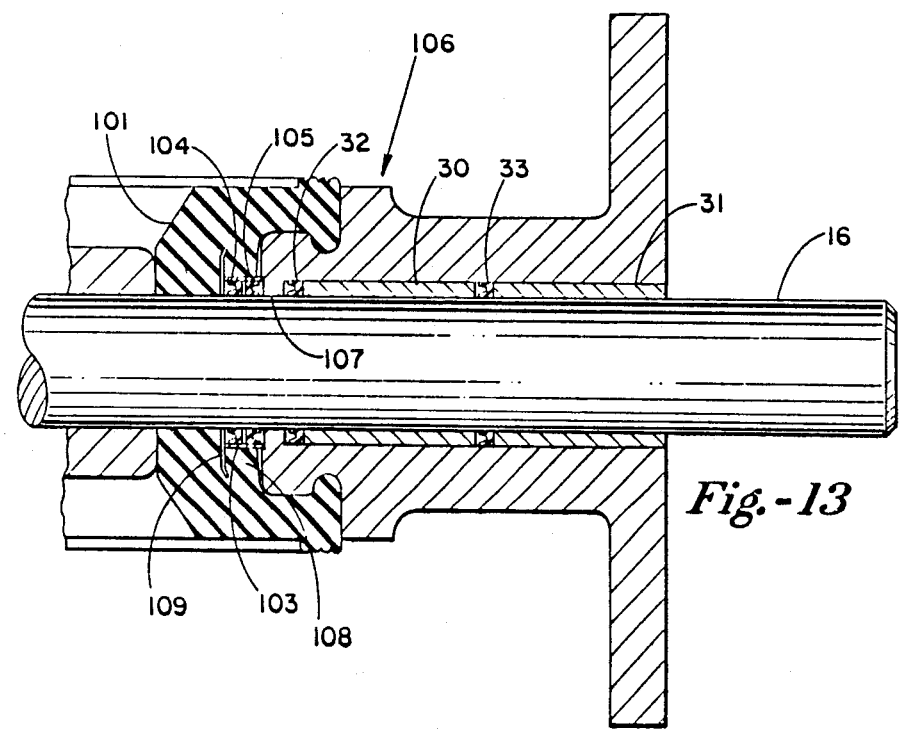

BUTTERFLY VALVES

CROSS REFERENCE TO RELATED APPLICATIONS

This application is a continuation-in-part of our co-pending application Ser. No. 095,895, filed Sept. 1, 1987 and titled "BUTTERFLY VALVES", NOW ABANDONED.

FIELD OF THE INVENTION

This invention relates generally to inflatable seals for butterfly valves and, more specifically, to improvements for a self-cleaning inflatable seal for a butterfly valve.

BACKGROUND OF THE INVENTION

The concept of inflatable seals for valves and more particularly inflatable seals that are used to seal the valve after the valve has been closed are known in the art. Some of the difficulties with the prior art inflatable seals are that they are not durable for use in abrasive environment and the sealing member recess often becomes contaminated with the particles being transferred thus requiring periodic flushing. The contamination problem is particularly troublesome if food materials are being transported since the accumulated food particles can contaminate the food and produce health risks. Another difficulty is that it is difficult to make a proper seal around the periphery of the butterfly disk and still provide an operable valve. While inflatable seals have been used with the axis of rotation of the valve offset from the valve seal, it has been found that such offset valves are prone to accumulation of material along the edges of the valve which may produce contamination in the system. Furthermore, valves with the axis of rotation offset from the seal provide for difficulty in opening or closing since the forces of the material acting on the valve surface create force imbalances making it difficult to oftentimes open and close the valve. In addition, such offset valves do not provide for equal flow since they provide a high profile that oftentimes interferes with the flow of material through the valve. In addition, such valves are often bulky and not suitable for use in high pressure large diameter material transportation systems.

Thus, one of the objectives of the invention is to provide an improved butterfly valve which cleanly and efficiently seals and, when retracted, has a low, clean profile that minimizes the opportunity for the transported material to accumulate particles in the valve and seal area. The present invention comprises an improvement to the inflatable seal butterfly valves by providing a new and improved seal.

DESCRIPTION OF THE PRIOR ART

The prior art is replete with numerous types of annular seals that are inflated to form a seal around the edge of a rotatable disk as evidenced by the following art:

The Livorsi U.S. Pat. No. 4,372,530 shows a seal for a butterfly valve which edge of the valve has a tapered end that engages a tapered sealing surface on the inside of a seat ring. The seat ring in turn has an O-ring on the outside which can be compressed to provide an air seal around the outside of the seat ring.

The Yoram Ben-Ur U.S. Pat. No. 4,378,104 shows a compressible solid seal for sealing the periphery of a butterfly valve. The solid seal deforms as the butterfly valve is brought to the closed position. The sealing ring includes a pair of legs to provide bi-directional sealing past the recess holding the sealing ring.

The Schuurman U.S. Pat. No. 4,254,936 shows an inflatable seal that contacts an annular sealing surface located on the face of the valve to seal the valve to the sealing member after the valve has been turned to the closed position. Periodic flushing is required to remove particles that fall into the chamber that holds the inflatable sealing member.

The Sumner U.S. Pat. No. 4,026,514 shows a butterfly sealing valve in which an annular inflatable sealing element has an annular sealing portion which extends through an annular opening to contact the edge of the peripheral sealing portion of the butterfly disk. In the uninflated condition the sealing element forms a light mechanical seal with the butterfly disk. Increasing the pressure enhances the seal.

The Danks Reissue Pat. No. 23,613 shows a butterfly valve having a flexible disk on the edge of the butterfly disk and a resilient sealant ring located in the housing with the sealing ring being inflated sufficiently to maintain a sealing contact between the ring and disks as the butterfly disk is open or closed.

The LaValley U.S. Pat. No. 4,540,457 shows a butterfly valve with an inflatable sealing member located around the periphery of a channel for engagement with the edge of a butterfly valve.

The Saar U.S. Pat. No. 2,705,016 shows a butterfly valve for operation at severe temperature. Liquids are circulated to maintain the proper temperature of the seal and the butterfly valve. The valve includes an inflatable seal that expands to contact the edge of the butterfly valve.

The Krause U.S. Pat. No. 4,289,296 shows a butterfly valve having a solid sealing member that extends radially inward from an annular recess to engage a butterfly disk member.

The Henrion U.S. Pat. No. 3,414,234 shows a system for throttle valves having a deformable annular shaped chamber that expands to form a seal with the edge of the throttle valve.

The Forst, et al. U.S. Pat. No. 3,638,674 shows an inflatable seal having a sealing member that expands to form a seal with the edge of a damper in a gas duct.

The De Wein U.S. Pat. No. 1,844,641 shows a valve seal having an elastic annular packing that is inflated to seal around rotable disk member. The elastic member is very thin and balloons out to form a seal with the rotatable disk member. The De Wein device has crevices between the elastic member and the housing for material to accumulate.

The Abraham U.S. Pat. No. 3,540,520 shows a valve seal with an elastic annular inflatable member that is inflated to form a seal around the periphery of a rotatable valve member. The elastic member is very thin and balloons out to form a seal with the valve member. The Abraham device also has crevices between the inflatable member and the housing to permit accumulation of material.

The Poggio U.S. Pat. No. 4,325,558 shows a sealing gasket for internal combustion engines to provide an oil seal along the valve stems through use of a set of concentric bands or ribs.

The Borcherdt U.S. Pat. No. 3,074,421 shows a rotatable disk valve that uses a diaphragm to form a seal between the rotatable disk valve and the housing.

The Manki U.S. Pat. No. 4,025,050 shows a butterfly valve with a rotatable valve member that engages the high point on a multilayer member on the body of the valve.

The Anderson U.S. Pat. No. 2,939,674 shows an irrigation pipe valve for use in irrigation systems. The valve includes an inflatable annular to seal around the edge of the valve. In the retracted condition the Anderson valve has a crevice between the inflatable seal and the housing.

The Liberman U.S. Pat. No. 4,176,675 shows a butterfly valve with an annular seal that is mechanically clamped around the seal to form a seal around the edge of the disk.

BRIEF SUMMARY OF THE INVENTION

Briefly, the present invention comprises an improvement to sealing members by providing a free closing butterfly disk that has clearance around the periphery of the butterfly disk when an annular sealing member is in an uninflated condition and the butterfly disk is in the closed position and that when the annular sealing member is inflated from an external source of pressurized fluid the sealing member does not balloon out but moves as an integral unit to engage the butterfly disk and then deforms locally to form an airtight seal with the edge of the butterfly disk to thereby form a physical barrier to lock the disk and to prevent further rotation of the butterfly disk. When the annular inflating sealing member is deflated, a pair of annular resilient legs located on the annular sealing member coact to concentrically and radially withdraw the annular sealing member from sealing and locking contact with the butterfly disk to thereby permit an operator to freely rotate the butterfly disk.

BRIEF DESCRIPTION OF THE DRAWINGS

FIG. 4 is a side sectional view showing our butterfly valve in closed, locked and sealed condition; FIG. 5 is another side sectional view showing our butterfly valve and the rotational housing;

FIG. 6 is an enlarged sectional view of the sealing member in a retracted position;

FIG. 7 is an enlarged sectional view of the sealing member in a locked position;

FIG. 11 shows the sealing ridges on the annular seal;

FIG. 12 shows how the annular sealing ridges are compressed when in use;

FIG. 13 shows an alternate sealing embodiment for use with liquids;

DESCRIPTION OF THE PREFERRED EMBODIMENT

Figure 1:
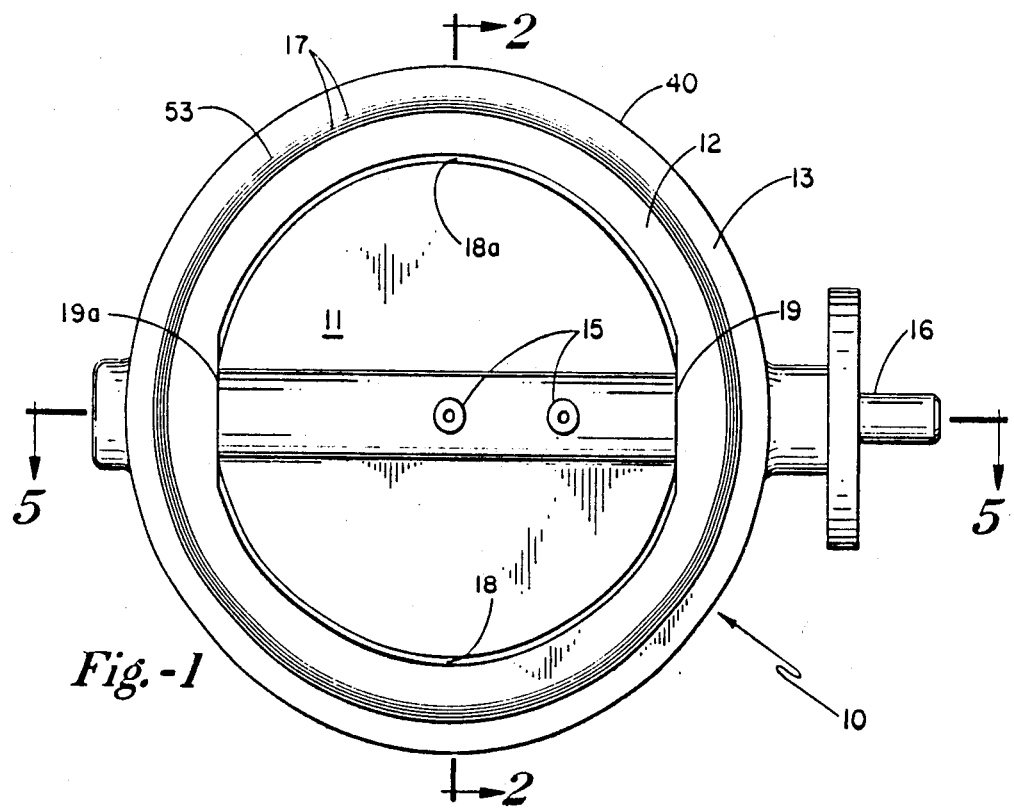
FIG. 1 is a front view of our butterfly valve in the closed position.

Referring to FIG. 1, reference numeral 10, generally identifies the butterfly valve of our present invention. The butterfly valve comprises a one-piece circular housing 13 for mating with a conduit. Located in a 360 rotatable relationship within an annular U-shaped inflatable sealing member 12 is a rotatable butterfly disk 11. Butterfly disk 11 which is made of a rigid material is fastened to a shaft 16 through bolts 15. Shaft 16 extends completely through the annular sealing member 12 and is rotatably supported in housing 13. A handle (not shown) is attached to shaft 16 to permit an operator to rotate butterfly disk 11 into the open or closed position. FIG. 1 shows butterfly disk 11 in the closed but unsealed position. The butterfly disk 11 and the sealing member 12 are shown with a clearance gap located therebetween. More specifically, on the periphery of butterfly disk 11 there is a gap 18 and 18a and on one end butterfly valve 11 contacts seal 12 in region 19 and on the opposite end butterfly valve contacts seal 12 in region 19a. The purpose of maintaining side gaps between sealing member 12 in the uninflated condition and the disk member is to provide relative ease in opening and closing of the butterfly disk 11. That is, there is no interference or mechanical friction to be overcome by the interference of the edge of the butterfly disk 11 with the edge of the sealing member 12. A further advantage is that there is no wear between sealing member 12 and the butterfly disk 11 thereby virtually eliminating the contamination problem produced by particles being abraded from the sealing member during opening and closing disk 11.

Figure 2:
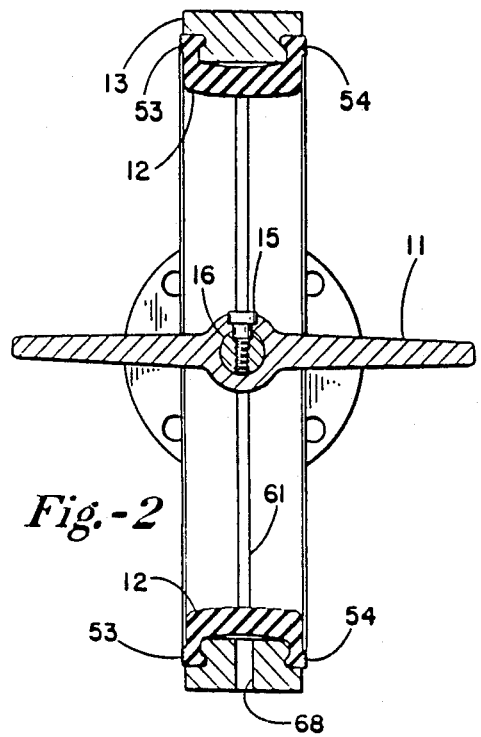
FIG. 2 is a side sectional view showing our butterfly valve in the open position.
Figure 3:
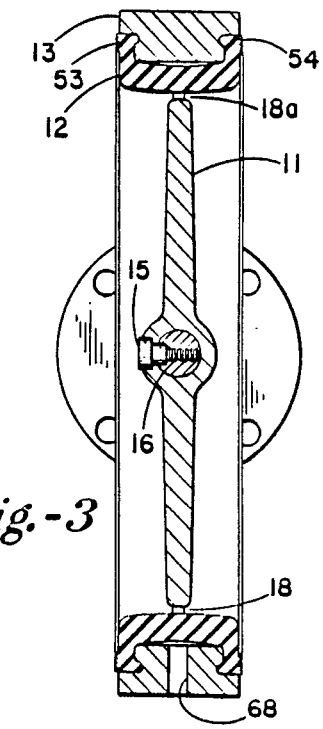
FIG. 3 is a side sectional view showing our butterfly valve in the closed but unlocked and unsealed condition.
Figure 8:
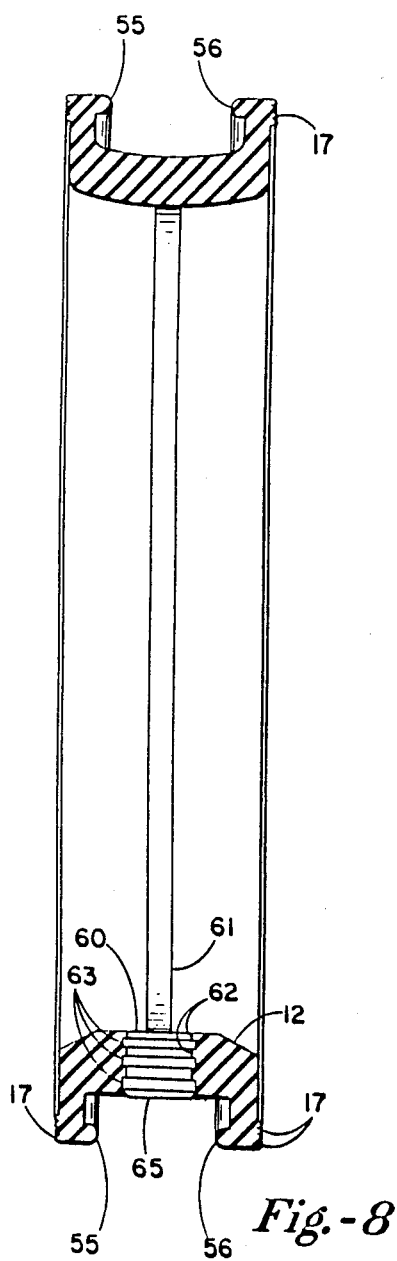
FIG. 8 is a sectional view of the annular sealing member.
Figure 9:
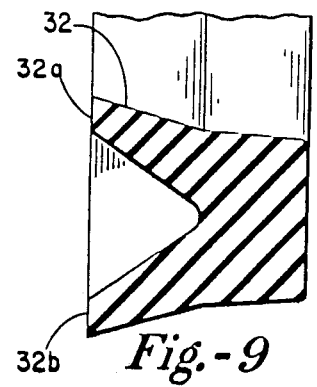
FIG. 9 is a sectional view of the seal to prevent air leakage.

To illustrate the operation of the invention and the various modes, reference should be made to FIGS. 2-6. FIG. 2 is a cross-sectional view that shows the butterfly disk 11 in the fully open position. FIG. 3 is a similar cross-sectional view showing the butterfly valve in the closed but unsealed position. FIG. 5 is a cross-sectional view showing the component parts and the location of the rotatable shaft 16 which extends through the annular inflatable sealing member 12. Located on one end of shaft 16 is a set of bearings 30 and 31 and similarly located on the other end is a bearing 29 to provide for rotation of shaft 16. Since shaft 16 extends through the annular seal member, it is necessary to provide an airtight seal around the end of shaft 16 extending through housing 13. The airtight seal around shaft 16 is provided by an oval U-shaped sealing ring members 32 and 33. FIG. 9 shows an enlarged cross-sectional view of the U-shaped sealing member 32 which is located in series with sealing member 33. Sealing ring 32 has flexible edges 32a and 32b that can expand outward to prevent passage of air from the interior of the annular sealing member outward along shaft 16. In addition to further prevent air from the annular sealing member 12 from escaping along the interior of shaft 16 to the interior of, the valve, the annular sealing member 12 contains a sealing region which is best depicted in FIG. 8. The sealing region prevents air from escaping from the interior of our annular sealing member. The sealing region is shown to comprise a set of annular grooves 63 and annular sealing ridges 62 which extend out to frictionally engage shaft 16. Also located in the inner side of the sealing region is an annular flexible tapered lip 65 which rotationally engages shaft 16 to prevent the flow of air radially inward along shaft 16. The sealing member as shown in FIG. 8 also contains a flat sealing region 61 section that extends around the periphery of annular sealing member 12 to engage the edge of the butterfly disk 11. FIG. 11 is an enlarged view of sealing member 12 illustrating that ridges 62 form protruding edges and members 63 form recess to produce a set of concentric annular ridges for engaging shaft 16. FIG. 12 illustrates the ridges and recess in phantom position as shown in FIG. 11 and their relationship to shaft 16 to form a concentric compressive contact with shaft 16 to provide an effective airtight seal along shaft 16. It will be apparent that compression of ridges 62 produce areas where the seal firmly grasps shaft 16. By providing a plurality of ridges it has been found to minimize the leakage along shaft 16.

Annular sealing member 12 has a self-cleaning dome-shaped exterior. The opposite sides of sealing member 12 contain annular sealing ridges 17 for sealing against the adjacent portion of a conduit. Annular sealing member 12 also includes annular lips 55 and 56 for engaging an annular recess to hold sealing member 12 in a retracted position during opening and closing operation.

In order to illustrate the sealing operation of the invention, reference should be made to FIGS. 4–7. FIG. 5 and FIG. 1 show inflatable annular sealing member 12 in the deflated condition with a clearance between butterfly disk 11 and the annular sealing member 12. FIG. 6 illustrates the seal 12 with the clearance between sealing edge 11a of valve 11 and sealing surface 61 in the closed position but unsealed position. A passage 68 permits air to be introduced into chamber 70 to inflate annular sealing member 12. FIG. 6 also clearly shows the dome-shaped top of annular sealing member 12. Sealing edge 11a mates with annular sealing surface 61 which extends around annular sealing member 12. Annular sealing member 12 comprises an elastomer or rubber member which has a U-shaped cross-section with a pair of annular legs 50 and 52 with annular lips 55 and 56 attached thereto to engage mating annular recesses in housing 13.

FIG. 6 shows annular sealing member 12 in the uninflated condition and identifies annular legs 50 and 52 on annular sealing member 12 in the uninflated condition or retracted condition. In the uninflated condition the natural resilience of the annular legs 50 and 52 hold sealing member 12 on housing 13 and thereby provide sufficient clearance to enable one to open and close the butterfly disk 11 with relative ease. In the sealed mode, which is shown in FIG. 4 and FIG. 7, air has been introduced into chamber 70 which is located between housing 13 and sealing member 12 through external inlet 68. In the inflated condition air pressure, typically 10 psi, is sufficient to radially stretch legs 52 and 50. The lengthening of legs 50 and 52 causes the more massive dome-shaped portion 51 of annulur sealing member 12 to deflect upward and deform locally around the edge of the butterfly disk to lock the edge of the butterfly disk 11 at the center portion of annular sealing member 12 thereby preventing accidental opening of buttERrefly disk 11. As can be seen in FIG. 4 and FIG. 7, the lengthening of the annular legs 50 and 52 and the local deformation of the more massive dome-shaped portion 51 around the edge 11a permits the edge of the disk to form a generally U-shaped locked engagement with annular sealing member 12 to both tightly seal and lock the edge of the butterfly disk 11 to annular sealing member 12 while the annular lips 55 and 56 securely hold a portion of the annular sealing member 12 in place and provide for automatic retraction of the annular sealing member 12 once the air pressure is released from chamber 70. FIG. 6 and FIG. 7 illustrate that the massive portion of the sealing member moves as a unit and as it does, it provides a self-cleaning action by always forcing materials into the valve as the valve is closed and sealed. That is, the more massive portion of the sealing member moves like a solid unit during pressurization of the inflatable seals, yet when the massive portion of the seal comes in contact with the valve it deforms locally to provide a locking seal around disk 11.

FIG. 6 shows annular elastomer sealing member 12 which has a domed section of predetermined thickness and annular legs 50 and 52 of thickness less than the domed section of seal 12. That is, the annular elastomer sealing member 12 is sufficiently thick in comparison to annular legs 50 and 52 so that under normal operating presure the entire annular sealing member portion 51 deflects upward in response to air pressure as an integral member that moves toward edge 11a of butterfly valve 11. That is, the integral annular sealing member 12 has sufficient rigidity so it does not deform as it expands but instead moves upward as a unit until edge 11a contacts sealing member 12. Increasing the pressure causes member 12 to form a slight local depression in member portion 51 and thereby provide an airtight seal around the edge 11a of butterfly valve 11, i.e., gaps 18 and 18a are eliminated as pressure is applied to inflate annular sealing member 12. FIG. 7 illustrates that although the edge of butterfly valve 11 is locked or slightly embedded in the deformable annular sealing member 12, there is relatively little actual alteration of the general shape of annular member 12. The integrity of the shape of annular member 12 that moves in and out to seal the valve greatly reduces the opportunity for particles to accumulate on the sealing member, yet one is able to form an effective seal through the resiliency of the annular legs, permitting the annular sealing member to tightly contact edge 11a.

The ridges 17 located on the side of annular sealing member 12 are normally in a compressed condition by an adjacent conduit to hold annular lips 55 and 56 in position in the mating recess in housing 13.

Figure 10:
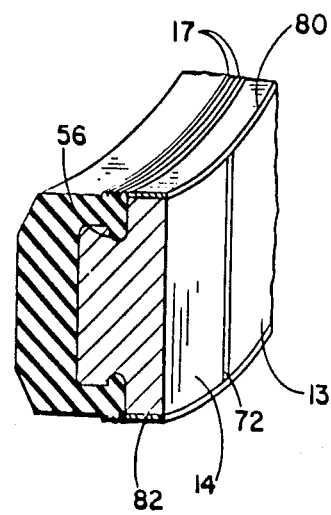
FIG. 10 shows the sealing member to seal the housing to adjacent conduits.

FIG. 10 illustrates the further aspect of our invention with a split housing 13a and 14a. FIG. 10 shows a first annular flat seal 80 which mates with annular flat sealing surface 40 (FIG. 5) and a second annular flat seal 82 which mates with flat sealing surface 41 (FIG. 5). Located between the ends of housing 13a and 14a is a flat sealing member 72 which similarly seals the housing section 13a to housing section 14a to prevent leakage of air from chamber 70 to the outside of housings 13a and 14a. The flat seals are typically made of a flexible sealing material such as rubber or the like.

FIG. 13 illustrates an alternative embodiment 106 of our invention which is suitable for use with transporting liquids. Shaft 16 is shown with bearings 30 and 31 and annular sealing members 32 and 33 which are identical to those shown in FIG. 5. Annular sealing member 101 is shown to have an annular inflatable chamber 109. Embodiment 106 also includes an annular lip 107 which acts as a barrier to the front of seal 32.

To seal the liquid being transported from the interior of annular chamber 109 there are provided a pair of annular seals 104 and 105, which are identical to seals 32 and 33 except that seal 107 faces left and seal 105 faces right. Located on the outside of seals 104 and 105 is an annular band 103 which forms a leakproof seal between itself and annular member 101. The lips on seals 104 and 105 point in the opposite direction to provide a two-way sealing to annular chamber 19. Annular band 108 radially confines the seals 104 and 105 to prevent any liquid in the system from accidentally entering chamber 109 around the exterior of seals 104 and 105.

Figure 14:
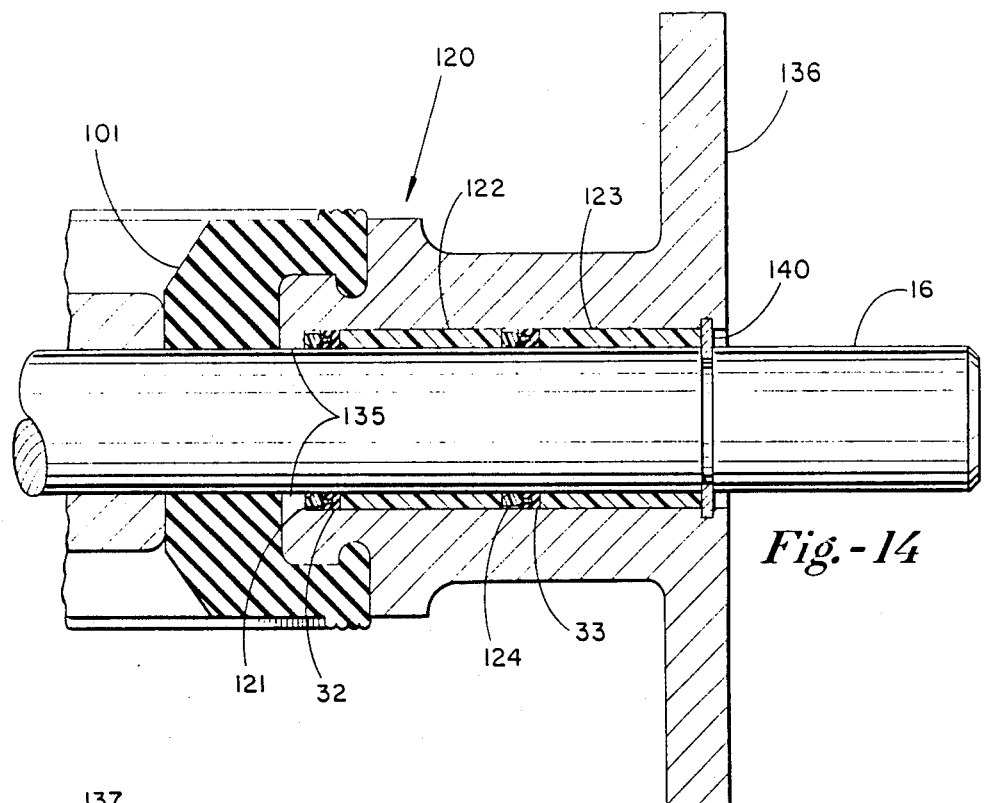
FIG. 14 shows a sealing embodiment for the rotatable shaft.

FIG. 14 shows a sealing embodiment 120 that uses dual sealing members 32 and 33 which are identical to the dual sealing members 32 and 33 shown in FIG. 13. Located in annular alignment and in integral relationship with annular sealing member 32 is an annular seal holding member 121. Similarly, located in annular alignment and in integral relationship with sealing member 33 is an annular seal holding member 124. A first annular nylon bearing 122 and a second annular nylon bearing 123, which are located between shaft 16 and shaft housing 136, provide for ease in rotation of shaft 16 in housing 136 while sealing members 32 and 33 prevent leakage of fluid along shaft 16. Annular nylon bearings 122 and 123, annular sealing members 32 and 33, and annular seal holding members 121 and 124 form an annular sealing assembly which is located in an annular chamber formed by shaft 16 and housing 136. An annular retaining lip 135 forms a stop to hold one end of the sealing assembly and a removable retaining ring 140 forms a stop to hold the opposite end of the sealing assembly. The use of retaining ring 140 provides for ease in removal and replacement of bearings 122 and 123 or seals 32 and 33.

Figure 15:
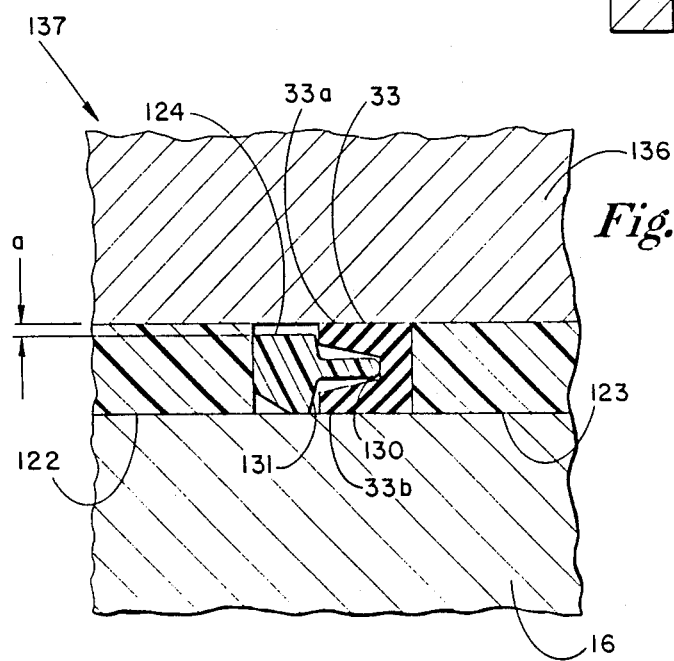
FIG. 15 shows a detail of the sealing embodiment of FIG. 14.

FIG. 15 shows an individual seal assembly 137 which is an enlarged portion of a section of the sealing assembly shown in FIG. 14. Annular seal 33 and annular seal holding member 124 are shown in the integral relationship with a tongue 130, which extends from shoulders 131, projecting into the opening formed by flexible sealing edges 33a and 3b. Annular seal holding member 124 is held in the integral position touching annular seal 33 nylon bearings 122 and 123. The location of tongue 130 in the recess formed by edges 33a and 33b permits the edges of seal 33 to move radially inward and also provides a radial stop to prevent the edges 33a and 33b from becoming misaligned during pressuration or rotation of shaft 16. Annular seal holding member 124 is identical to annular seal holding member 121 and forms a similar integral relationship with annular seal 32. To provide for ease of insertion of nylon seal holding member 124 there is provided a slight annular clearance of a few thousands which is designated by the letter "a". While nylon is described as the preferred material for the holding member and the bearings, other material could also be used. The use of two identical seal members in series virtually eliminates the opportunity for leakage along shaft 16.

We claim:

1. A butterfly valve for opening and closing an opening in a conduit comprising:
    a housing
    an annular inflatable sealing member located in said housing, said annular inflatable sealing member made from an elastomer material, said annular inflatable sealing member having elastomer legs that lengthen and contract in response to pressurization and a self-cleaning elastomer sealing portion of sufficient thickness that moves radially inward and outward as a unit in response to pressurization of said inflatable sealing member, said elastomer sealing portion locally deformable to form a seal around a rotatable butterfly disk, said annular inflatable sealing member including annular means to hold said annular inflatable sealing member in position on said housing to form an air chamber between said housing and said annular inflatable sealing member;
    a rotatable butterfly disk mounted on a shaft extending through said annular inflatable sealing member, said butterfly disk having an exterior edge which, when in the closed condition and when the annular inflatable sealing member is in the uninflated condition, has a clearance therebetween; and
    means in said butterfly valve to prevent fluid from escaping around said shaft, so that when fluid is introduced into the chamber to inflate the annular inflatable sealing member, it expands the inflatable sealing member to form a sealing and locking engagement with said butterfly disk.

2. The butterfly valve of claim 1 wherein said annular inflatable member includes annular elastomer legs to permit radial inward expansion of said annular inflatable sealing member.

3. The butterfly valve of claim 2 wherein said annular means comprises annular lips for engaging mating annular recess in said housing.

4. The butterfly valve of claim 3 wherein said annular inflatable sealing member comprises a U-shape with a pair of sealing members located on said annular inflatable sealing member.

5. The butterfly valve of claim 4 wherein said means to prevent fluid from escaping around said shaft comprises a plurality of ridges and grooves.

6. The butterfly valve of claim 5 wherein said annular sealing member has an annular flat sealing surface located thereon to seal said butterfly disk to said seal.

7. The butterfly valve of claim 6 wherein said butterfly valve includes a sealing edge having a surface that is substantially parallel to the sealing region on said annular inflatable sealing member to thereby provide sealing surfaces for forming an airtight seal between the sealing region and the sealing edge.

8. The butterfly valve of claim 1 wherein said means to prevent fluid from escaping around said shaft comprises a pair of sealing rings.

9. The butterfly valve of claim 8 wherein said means to prevent fluid from escaping around said shaft includes an annular band located in said annular inflatable sealing member, and sealing member having lips pointing in opposite directions for prevent escape of fluid from the system.

10. A butterfly valve for opening and closing an opening in a conduit comprising:
    a housing;
    an annular inflatable sealing member located in said housing, said annular inflatable sealing member having a dome-shaped surface, said annular inflatable sealing member having elastomer legs that lengthen and contract in response to pressurization and a self-cleaning elastomer sealing portion of sufficient thickness that radially inward and outward as a unit in response to pressurization of said inflatable sealing member, said elastomer sealing portion locally deformable to form a seal around a rotatable butterfly disk, said annular inflatable sealing member made from an elastomer material, said annular inflatable sealing member including annular means to hold said annular inflatable sealing member in position on said housing to form a fluid chamber between said housing and said annular inflatable sealing member;

a rotatable butterfly disk mounted on a shaft extending through said annular inflatable sealing member, said butterfly disk having an exterior edge which, when in the closed condition and when the annular inflatable sealing member is in the uninflated condition, has a clearance therebetween; and a sealing assembly located between said housing and said shaft, said sealing assembly including an annular seal an an annular seal holding member forming an integral relationship with said annular seal to thereby prevent escape of fluid between said shaft and said housing.

11. The butterfly valve of claim 10 wherein said sealing assembly includes at least two seal holding members and two annular seals.

12. The butterfly valve of claim 11 wherein each of said seal holding members has a tongue that projects into an opening formed in an adjoining annular seal.

13. The butterfly valve of claim 12 wherein said seal holding members, said annular seal are held in an annular chamber formed by said houding and said shaft.

14. The butterfly valve of claim 13 wherein the annular chamber having two ends with a stop on one end and a retaining ring stop on the opposite end.

* * * * *